United States Patent [19]

Bakal et al.

[11] Patent Number: 4,844,921

[45] Date of Patent: Jul. 4, 1989

[54] BUTTER FLAVORED GRANULES

[75] Inventors: Abraham I. Bakal, Parsippany; Marvin E. Eisenstadt, Neponsit, both of N.Y.

[73] Assignee: Cumberland Packing Corp., Brooklyn, N.Y.

[21] Appl. No.: 89,683

[22] Filed: Aug. 26, 1987

[51] Int. Cl.[4] .................... A23D 3/00; A23L 1/22
[52] U.S. Cl. ...................... 426/98; 426/603; 426/613; 426/650; 426/804
[58] Field of Search ............... 426/98, 602, 603, 613, 426/650, 804

[56] References Cited

U.S. PATENT DOCUMENTS 4,414,229  11/1983  Bakal et al. .................. 426/603 X

*Primary Examiner*—Donald E. Czaja
*Assistant Examiner*—Celine T. Callahan
*Attorney, Agent, or Firm*—Steinberg & Raskin

[57] ABSTRACT

Granules having natural butter flavor are provided, the granules being formed of a carrier such as maltodextrin, a small amount of a fat such as a vegetable oil, and enzyme modified butter oil, with or without, but preferably with a water soluble butter flavor component. The granules may include salt to taste, if desired and may also include an emulsifier. The granules of the invention are very low in calories, have a high intensity butter flavor, have no cholesterol and dissolve instantly upon contact with wet and hot foods to provide the flavor and mouthfeel of butter.

11 Claims, No Drawings

BUTTER FLAVORED GRANULES

BACKGROUND OF THE INVENTION

Butter is a very popular food made of butter fat or cream, milk solids, and natural coloring, and may also contain salt. The fat content of butter is usually about 80%.

Although butter is very high in cholesterol, containing about 220 mg cholesterol/100 g, and very high in calories, more than 700 calories/100 g, butter is nevertheless an extremely popular product. The popularity of butter is mainly due to its unique and characteristic flavor which is the basis for its wide acceptance and utilization as an ingredient in food products. Health experts have recommended the elimination from or reduction of butter in the diet in order to reduce and control the ingestion of cholesterol. This is due to high cholesterol diets having been associated with increased incidence in heart disease.

Physicians have also recommended the elimination or reduction of butter from the diet because of the high caloric content.

The art has recognized the need for a product having the typical and characteristic flavor of butter but without the cholesterol and the high caloric content of butter. U.S. Pat. No. 3,653,921 of Buhler, et al. describes a method for preparing a butter flavor composition consisting of lipolyzed butter oil. The product of this patent provides a highly effective substitute for the flavor of butter. However, the product is best used by first mixing with hot water prior to use.

In U.S. Pat. No. 4,414,229, Bakal, et al. describe a process for the preparation of a spread having natural butter flavor. The butter flavor spread of this patent provides highly effective butter flavor in the form of a spread and is substantially free of cholesterol but does provide a higher caloric content than does the butter flavor composition of U.S. Pat. No. 3,653,921.

SUMMARY OF THE INVENTION

It is accordingly a primary object of the present invention to provide a composition which can easily be used without first being mixed with water and which provides both natural butter flavor and the mouthfeel of butter without the high cholesterol and high caloric content of butter.

It is yet another object of the present invention to provide butter flavored granules which can be simply sprinkled on hot, moist foods to provide natural butter flavor without cholesterol and with very little caloric content.

It is yet a further object of the present invention to provide a method of producing the butter flavored granules.

Other objects and advantages of the present invention will be apparent from a further reading of the specification and of the appended claims.

With the above and other objects in view, the present invention mainly comprises a granulated product formed of a small amount of fat, maltodextrin having a low DE (dextrose equivalent), the DE being less than 5, a butter flavor component consisting at least of an oil soluble component and preferably also including a water soluble component, and an inert carrier which may be maltodextrin of a higher DE. The product may also include salt to taste.

In accordance with a preferred embodiment of the invention, the amount of fat is between 1 and 20% by weight of the composition, preferably 5-20% by weight. The fat is most preferably a vegetable oil.

The amount of salt is preferably between about 1-10% by weight.

The amount of low DE maltodextrin is preferably between about 1-10% by weight, the DE thereof being preferably less than 5. Most preferably this maltodextrin is derived from potato.

The butter flavor component, which as indicated above consists at least of an oil soluble component and preferably also includes a water soluble component, is preferably present in an amount of about 0.05-10% by weight, most preferably between about 1-5% by weight. All percentages by weight are of the final product on a dry solids basis.

The oil soluble component of the butter flavor component may be an enzyme modified butter oil (EMBO) or lipolyzed butter oil (LBO).

EMBO or LBO is obtained by incubating either milk fat, derived directly from whole milk, or butter oil derived from butter with a lipase (esterase) enzyme as described, for example, in U.S. Pat. No. 2,794,743. During the incubation period the enzyme system catalytically releases fatty acids from the butter fat and results in certain end products. Specific action of the lipase system releases volatile, flavorful, fatty acids including butyric, caproic, caprylic and capric acids in much greater molar concentrations than, but together with, long chain fatty acids. To control the flavor development in the finished product, the system is heated to completely destroy the enzyme activity and to reduce the bacterial counts to very low levels.

The water soluble component consists of distillates from butter or cultured milk. This product, also known as starter distillate, is the mixture of flavor compounds distilled from butter or cultured milk. It contains the flavor compounds which are volatile with water at 212° F. While the major component of starter distillate is diacetyl, the starter distillate as a whole, however, gives a flavor which is much more pleasant than that of synthetic diacetyl because of the presence of other flavor substances produced by the bacteria used in culturing the milk. Starter distillate is obtainable commercially as "starter distillate".

The water soluble butter flavor component is used in the composition of the present invention in an amount of up to 1% by weight of the final product, and preferably in an amount of 0.05-0.5% of the final product on the dry solids basis.

The above mentioned components are mixed with an inert carrier such as dextrins, whey solids, corn syrup solids and the like. The most preferred inert carrier is maltodextrin, namely maltodextrins with a DE of between 10 and 20.

The preferred ranges of components of the compositions of the present invention are set forth below:

|  | Percent By Weight |
|---|---|
| Low DE potato maltodextrin (less than 5 DE) | 1–10; pref. 2–8 |
| Vegetable oil | 1–20; pref. 5–10 |
| Salt | 0–10; pref. 1–3 |
| EMBO | 0.5–10; pref. 1–5 |
| Water soluble butter flavor component (starter distillate) | 0.0–1.0; pref. 0.05–0.5 |
| Emulsifier (lecithin) | 0–1.0; pref. 0.01–0.05 |

|                          | Percent By Weight |
| ------------------------ | ----------------- |
| Maltodextrin (10 DE-20 DE) | q.s. 100%       |

The preferred process for making the product of the invention consists in first preparing a 50-60% solids emulsion, heating the emulsion to between about 120°-160° F., and passing the emulsion through a homogenizer to form a stable emulsion. This emulsion is then conveyed to a spray tower equipped with pressure nozzles and with the provision for the introduction of an inert gas such as nitrogen or carbon dioxide (preferably carbon dioxide). The emulsion is then sprayed by means of the inert gas at an exit air temperature at the spray tower of preferably about 210° F. and utilizing a carbon dioxide pressure of 15 psig.

The resulting dry product has a bulk density of between 20 and 35 g/100 cc and preferably between 22 and 30 g/100 cc. The final product exhibits the following characteristics:

1. It has only 4 calories/gram yet has the flavor intensity of about 10 g of butter, for over 94% savings in calories.
2. It has no cholesterol. 3. It has the natural flavor of butter. 4. It dissolves instantly upon contact with wet and hot foods, thus providing not only the flavor but also the mouthfeel of butter. 5. It has an extended shelf-life and is extremely stable to oxidation.

DESCRIPTION OF PREFERRED EMBODIMENTS

The following examples are given to further illustrate the present invention. The scope of the invention is not, however, meant to be limited to the specific details of the examples.

EXAMPLE 1

A mixture of 5% (all percentages are by weight) of maltodextrin from potato having a DE of 3, 5% vegetable oil, 2% salt, 4% EMBO, 1% starter distillate, 0.5% lecithin and 82.5% maltodextrin having a DE of 10 is emulsified with water of equal amount and the emulsion is heated to a temperature of about 140° F. The emulsion is passed through a homogenizer to form a stable emulsion which is then conveyed to a spray tower equipped with pressure nozzles. The resulting emulsion is spray dried under a carbon dioxide pressure of 15 psig at a temperature of about 210° F.

The resulting dry product has a bulk density of about 25 g/cc. The product has a caloric content of about 4 calories per gram, each gram having the flavor intensity of about 10 g of butter. The butter flavor is natural butter flavor and all components of the granular product are natural.

The granules may be sprinkled on a hot, wet food such as cooked string beans, cooked potatoes, etc. to provide both the flavor and mouthfeel of butter.

The product has a long shelf-life. The product is extremely stable to oxidation.

EXAMPLE 2

Example 1 is repeated, however utilizing the components in the following percentages: 4% maltodextrin DE 1, 6% vegetable oil, 1% salt, 3% EMBO, 0.5% starter distillate, 0.5% lecithin, and 85% maltodextrin 10 DE.

The resulting product has substantially the same characteristics as the product of Example 1.

While the invention has been illustrated with respect to particular compositions, it is apparent that various modifications of the invention can be made without departing form the spirit or scope thereof.

What is claimed is:

1. Butter flavored granules having a natural butter flavor and the mouthfeel of butter without providing the cholesterol and calories of butter, said granules being formed by spray drying under pressure at a temperature of about 210° F. an emulsion of a natural butter flavor component consisting essentially of an oil soluble component formed of an enzyme modified butter oil or lipolyzed butter oil and being present in an amount of about 0.05-10% by weight of the granules, a fat in an amount of about 1-20% by weight of the granules, and maltodextrin having a low dextrose equivalent of less than 5, in an amount of about 1-10% by weight of the granules, all distributed in a balance of an inert carrier selected from the group consisting of dextrins, maltodextrins, whey solids, and corn syrup solids.

2. Butter flavored granules according to claim 1 wherein said inert carrier is a maltodextrin having a dextrose equivalent of between about 10 and 20.

3. Butter flavored granules according to claim 1 wherein said butter flavor component includes starter distillate in an amount of up to 1% by weight as water soluble component.

4. Butter flavored granules according to claim 3 wherein said inert carrier is a maltodextrin having a dextrose equivalent of between about 10 and 20.

5. Butter flavored granules according to claim 4 wherein said fat is a vegetable oil.

6. Butter flavored granules according to claim 5 and also including salt.

7. Butter flavored granules according to claim 6 and also including an emulsifier.

8. Butter flavored granules according to claim 6 wherein said salt is present in an amount of up to about 10% by weight.

9. Butter flavored granules according to claim 8 and including an emulsifier in an amount of up to 1% by weight.

10. Butter flavored granules having a natural butter flavor and the mouthfeel of butter without providing the cholesterol and calories of butter, said granules being formed of a natural butter flavor component consisting essentially of an oil soluble component formed of an enzyme modified butter oil or a lipolyzed butter oil in an amount of about 0.05-10% by weight, a fat in an amount of about 1-20% by weight, and maltodextrin having a low dextrose equivalent of less than 5 in an amount of about 1-10% by weight, all distributed in a balance of an inert carrier selected from the group consisting of dextrins, maltodextrins, whey solids, and corn syrup solids.

11. Butter flavored granules according to claim 10 wherein said butter flavor component includes starter distillate in an amount of up to 1% by weight as water soluble component.

* * * * *